(12) United States Patent
Nojiri

(10) Patent No.: US 9,273,586 B2
(45) Date of Patent: Mar. 1, 2016

(54) CONTACT-TYPE INFRARED TEMPERATURE SENSOR FOR HIGH TEMPERATURE MEASUREMENT, THERMAL APPARATUS, AND EXHAUST SYSTEM

(71) Applicant: SEMITEC CORPORATION, Tokyo (JP)

(72) Inventor: Toshiyuki Nojiri, Tokyo (JP)

(73) Assignee: SEMITEC CORPORATION, Tokyo (JP)

( * ) Notice: Subject to any disclaimer, the term of this patent is extended or adjusted under 35 U.S.C. 154(b) by 0 days.

(21) Appl. No.: 14/418,446

(22) PCT Filed: Jul. 23, 2013

(86) PCT No.: PCT/JP2013/069890
§ 371 (c)(1),
(2) Date: Jan. 30, 2015

(87) PCT Pub. No.: WO2014/021140
PCT Pub. Date: Feb. 6, 2014

(65) Prior Publication Data
US 2015/0219000 A1    Aug. 6, 2015

(30) Foreign Application Priority Data

Aug. 3, 2012 (JP) ................ 2012-172868

(51) Int. Cl.
| | |
|---|---|
| G01J 5/20 | (2006.01) |
| F01N 11/00 | (2006.01) |
| G01J 5/00 | (2006.01) |
| G01J 5/08 | (2006.01) |
| F02D 41/14 | (2006.01) |
| F02M 25/07 | (2006.01) |

(52) U.S. Cl.
CPC .......... *F01N 11/002* (2013.01); *F02D 41/1446* (2013.01); *F02D 41/1451* (2013.01);

(Continued)

(58) Field of Classification Search
CPC ................... G01J 5/02; G01J 5/049
See application file for complete search history.

(56) References Cited

U.S. PATENT DOCUMENTS

| | | | |
|---|---|---|---|
| 2003/0182933 A1* | 10/2003 | Adelman ........... | B01D 53/9495 60/285 |
| 2005/0263705 A1* | 12/2005 | Asatani ..................... | F24C 5/16 250/341.1 |

FOREIGN PATENT DOCUMENTS

| | | |
|---|---|---|
| JP | 44-7597 | 3/1969 |
| JP | 54-058109 | 5/1979 |

(Continued)

OTHER PUBLICATIONS

"International Search Report (Form PCT/ISA/210)", mailed on Oct. 29, 2013, with English translation thereof, pp. 1-2, in which two of the listed references (JP11-083630 and JP2009-156221) were cited.

*Primary Examiner* — Kiho Kim
(74) *Attorney, Agent, or Firm* — Jianq Chyun IP Office

(57) ABSTRACT

A contact-type infrared temperature sensor 1 for high temperature measurement is provided with: a heat-resistant cylindrical member 2, having a cylindrical shape with one end as a closed section 21 and the other end as an open section 22; an infrared temperature detecting member 4, disposed facing and spaced from the closed section 21, and including no infrared filter; and an optical function section 33, having an infrared light inlet 31 disposed facing and spaced from the closed section 21 by a predetermined dimension, restricting infrared light radiated from the region spaced between the temperature-sensitive section and the infrared light inlet by the predetermined dimension to a range of the region by the infrared light inlet 31 and guiding the infrared light to the infrared temperature detecting member 4.

7 Claims, 7 Drawing Sheets

(52) U.S. Cl.
CPC ............ *G01J5/0014* (2013.01); *G01J 5/0803* (2013.01); *G01J 5/0815* (2013.01); *G01J 5/0818* (2013.01); *G01J 5/20* (2013.01); *F02M 25/07* (2013.01); *G01J 5/0806* (2013.01)

(56) References Cited

FOREIGN PATENT DOCUMENTS

| JP | S62-39733 | 2/1987 |
|----|-----------|--------|
| JP | H02-16425 | 1/1990 |
| JP | 04-147021 | 5/1992 |
| JP | 05-079919 | 3/1993 |
| JP | 07-043220 | 2/1995 |
| JP | 11-083630 | 3/1999 |
| JP | 2000-046653 | 2/2000 |
| JP | 2002323377 A * | 11/2001 |
| JP | 2003-116795 | 4/2003 |
| JP | 2003-234203 | 8/2003 |
| JP | 2004-249115 | 9/2004 |
| JP | 2007-218591 | 8/2007 |
| JP | 2009-156221 | 7/2009 |
| JP | 2011-043485 | 3/2011 |
| JP | 2011-043486 | 3/2011 |
| JP | 2011-043487 | 3/2011 |

\* cited by examiner

CONTACT-TYPE INFRARED TEMPERATURE SENSOR FOR HIGH TEMPERATURE MEASUREMENT, THERMAL APPARATUS, AND EXHAUST SYSTEM

CROSS-REFERENCE TO RELATED APPLICATION

This application is a 371 application of an international PCT application serial no. PCT/JP2013/069890, filed on Jul. 23, 2013, which claims the priority benefit of Japan application no. 2012-172868, filed on Aug. 3, 2012. The entirety of each of the above-mentioned patent applications is hereby incorporated by reference herein and made a part of this specification.

FIELD OF THE INVENTION

The invention relates to a contact-type infrared temperature sensor for high temperature measurement that detects a temperature of a heat source, and to a thermal apparatus and an exhaust system that use the contact-type infrared temperature sensor.

DESCRIPTION OF THE RELATED ART

In various thermal apparatuses having a heat source provided therein, a temperature sensor is used to detect and measure a temperature of the heat source so as to control the apparatus.

For example, to measure an exhaust gas (heat source) of a car or the like equipped with a diesel engine, a temperature sensor using a thermistor element as a temperature sensing element is used.

Specifically, in the car or the like equipped with a diesel engine, an exhaust gas recirculation (EGR) system is employed for suppressing nitrogen oxides (NOx) and reducing pumping loss.

By mixing an exhaust gas back into an intake air, the EGR system can retard combustion of inert substances contained in the exhaust gas and lower a combustion temperature. In addition, the exhaust gas after combustion accordingly has a low oxygen content. For these reasons, nitrogen oxides (NOx) that are easily generated by combustion under a high-temperature and oxygen-excessive condition can be suppressed from being generated.

Further, by adjusting the oxygen content in the intake air by the amount of the exhaust gas, the pumping loss can be reduced.

In this EGR system, the temperature of the exhaust gas is measured by the temperature sensor so that the optimum control can be performed. Also, in this case, to increase thermal responsiveness of the temperature sensor, the temperature sensing element of the temperature sensor may be placed in a high-temperature environment, such as being directly arranged in the high-temperature exhaust gas.

PRIOR-ART DOCUMENTS

Patent Documents

Patent Document 1: Japanese Unexamined Patent Application Publication No. Hei 7-43220
Patent Document 2: Japanese Unexamined Patent Application Publication No. 2003-234203
Patent Document 3: Japanese Unexamined Patent Application Publication No. 2011-43485
Patent Document 4: Japanese Unexamined Patent Application Publication No. 2011-43486
Patent Document 5: Japanese Unexamined Patent Application Publication No. 2011-43487

SUMMARY OF THE INVENTION

Problems to be Solved by the Invention

However, in such a case where the temperature sensing element is placed in the high-temperature environment, thermal deterioration easily occurs due to the high temperature. Thus, the temperature sensing element, including an electrical connecting part thereof, must be configured to be highly heat-resistant and highly durable. Consequently, manufacturing cost of the temperature sensor may increase.

The invention has been achieved in light of the above problems and aims to provide the following: a contact-type infrared temperature sensor for high temperature measurement, wherein an infrared temperature detecting member can be disposed spaced from a heat source so that contact-type infrared temperature sensor is capable of ensuring reliability by suppressing thermal deterioration and capable of reducing manufacturing cost; a thermal apparatus using the contact-type infrared temperature sensor; and an EGR system using the contact-type infrared temperature sensor.

Means for Solving the Problems

A contact-type infrared temperature sensor for high temperature measurement according to claim 1 is a contact-type infrared temperature sensor for high temperature measurement suitable for a measured object having a temperature of 200° C. or higher, and is characterized by including: a heat-resistant cylindrical member, having a cylindrical shape with one end as a closed section and the other end as an open section, and including a temperature-sensitive section on a side where the closed section is; an infrared temperature detecting member, disposed facing and spaced from the temperature-sensitive section, and including no infrared filter; and an optical function section, having an infrared light inlet disposed facing and spaced from the temperature-sensitive section by a predetermined dimension, wherein the optical function section restricts infrared light radiated from region spaced between the temperature-sensitive section and the infrared light inlet by the predetermined dimension to a range of the region by the infrared light inlet and guides the infrared light to the infrared temperature detecting member.

The temperature-sensitive section is a member receiving heat from a heat source and radiating infrared light, and can be configured as, e.g., a thin wall section. However, the configuration or shape thereof is not particularly limited.

In addition, a material that forms the cylindrical member is preferably a metal or ceramic material, but is not limited to a specific material as long as the material is heat-resistant. Further, the infrared temperature detecting member can employ a temperature sensing element of a thermal type or quantum type, etc., but the form or configuration thereof is not limited.

Furthermore, the optical function section is a part having a function of guiding the infrared light radiated from the temperature-sensitive section to the infrared temperature detecting member, and is not limited to specific member or configuration.

According to such invention, a contact-type infrared temperature sensor capable of ensuring reliability by suppressing thermal deterioration can be provided.

The contact-type infrared temperature sensor for high temperature measurement according to claim 2 is characterized in that in the contact-type infrared temperature sensor for high temperature measurement according to claim 1, the temperature-sensitive section is configured to be formed thin.

According to such invention, a contact-type infrared temperature sensor having good thermal responsiveness can be provided.

The contact-type infrared temperature sensor for high temperature measurement according to claim 3 is characterized in that in the contact-type infrared temperature sensor for high temperature measurement according to claim 1, the cylindrical member is made of metal or ceramics.

According to such invention, heat resistance of the cylindrical member is easily ensured.

The contact-type infrared temperature sensor for high temperature measurement according to claim 4 is characterized in that in the contact-type infrared temperature sensor for high temperature measurement according to claim 1 or claim 2, the infrared temperature detecting member includes a thermopile element.

A thermal apparatus according to claim 5 is characterized by including: a heat source; and the contact-type infrared temperature sensor for high temperature measurement according to claim 1 that measures a temperature of the heat source.

The thermal apparatus includes a machine having a heat source, e.g., an engine using an exhaust gas as the heat source, a microwave oven, a gas water heater, a stove, etc.

An exhaust system according to claim 6 is characterized by including: an engine; an intake passage and an exhaust passage connected to the engine; and the contact-type infrared temperature sensor for high temperature measurement according to claim 1 attached to the exhaust passage.

According to such invention, the contact-type infrared temperature sensor can be suitably used on the exhaust system.

According to the invention, a contact-type infrared temperature sensor for high temperature measurement capable of ensuring reliability by suppressing thermal deterioration, and a thermal apparatus and an exhaust system that use the contact-type infrared temperature sensor can be provided.

DESCRIPTION OF THE EMBODIMENTS

Figure 1:
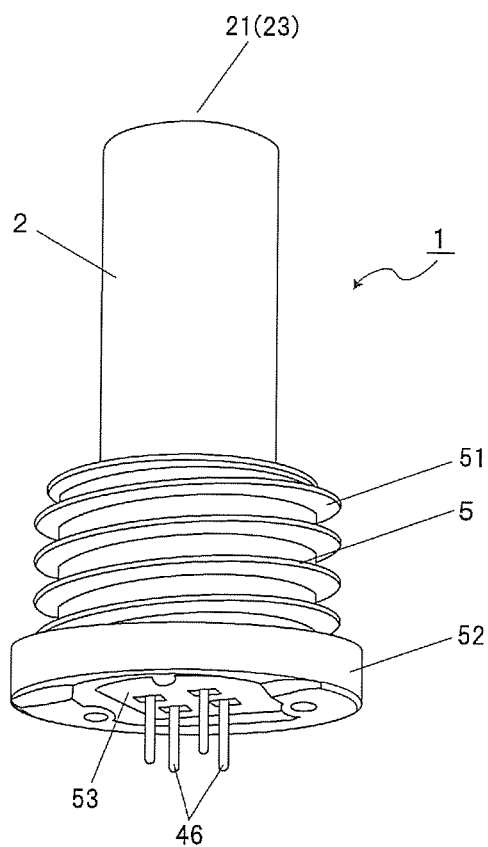
FIG. 1 is a perspective view showing a contact-type infrared temperature sensor according to the first embodiment of the invention.
Figure 2:
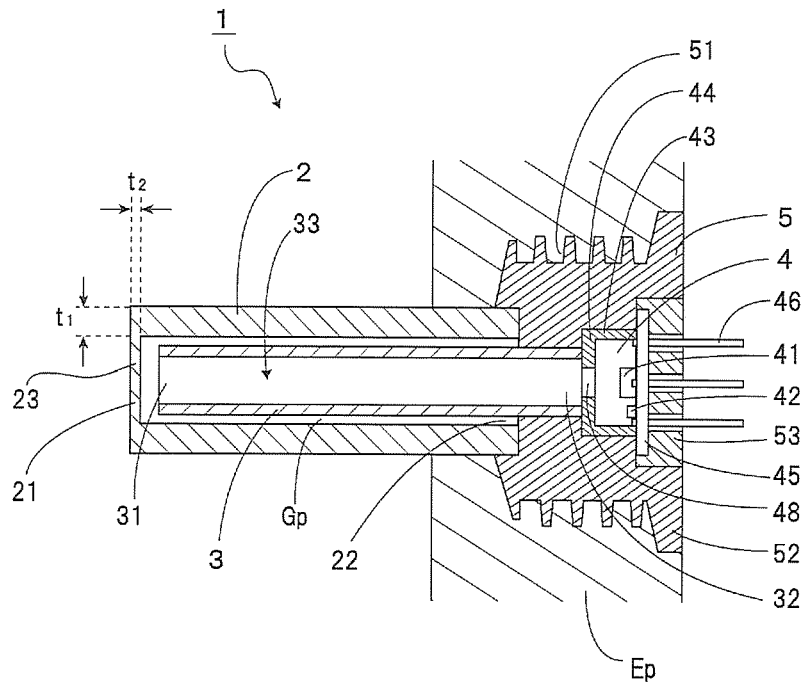
FIG. 2 is a cross-sectional view showing a state in which the same contact-type infrared temperature sensor is attached to an exhaust pipe of an engine.

Hereinafter, a contact-type infrared temperature sensor according to the first embodiment of the invention is described with reference to FIG. 1 and FIG. 2. FIG. 1 is a perspective view showing the contact-type infrared temperature sensor, and FIG. 2 shows a schematic cross-section in which the contact-type infrared temperature sensor has been attached to an exhaust pipe of an engine.

A contact-type infrared temperature sensor 1 absorbs infrared energy as heat and outputs by utilizing a temperature rise caused by the heat absorption, the contact-type infrared temperature sensor 1 including a cylindrical member 2, an optical means 3, an infrared temperature detecting member 4 and a holder 5.

The cylindrical member 2 is made of a metal having heat resistance. For example, the cylindrical member 2 is made out of stainless steel and formed into a bottomed cylindrical shape with one end as a closed section 21 and the other end as an open section 22. The cylindrical member 2 is formed by subjecting a sheet material to press processing or by subjecting a wire to cold forging processing, and so on.

A temperature-sensitive section 23 is formed on the side of the closed section 21, i.e., on a portion of the cylindrical member 2. The temperature-sensitive section 23 can directly contact a heat source and receive heat. In detail, the temperature-sensitive section 23 is a thin wall section formed on the side where the closed section 21 is. While a wall thickness dimension $t_1$ of a cylindrical section is about 0.4 mm, a wall thickness dimension $t_2$ of the thin wall section is set about ½ or less of 0.2 mm or less.

Moreover, the thin wall section as the temperature-sensitive section 23 of the cylindrical member 2 may be integrally formed with the cylindrical section or may be formed separately. If the thin wall section is formed separately, the thin-formed and separated member can be joined to one end of the cylindrical section by welding or brazing, etc.

In addition, austenitic stainless steel with excellent heat resistance, such as SUS310S, SUS304 or SUS316, etc., can be used as the stainless steel for forming the cylindrical member 2. Generally, austenitic stainless steel is preferred. However, Inconel (registered trademark) being a nickel-based alloy, Kovar being a cobalt-based alloy and Kanthal being a chromium-aluminum-based alloy and other highly heat-resistant metal materials may also be used to form the cylindrical member 2.

Among the alloys, Kanthal is the most excellent in heat resistance and oxidation resistance and has a maximum operating temperature of 1350° C. In addition, if there is a large amount of sulfide gas, it is preferred to use Kanthal.

For measuring a high temperature of 1400° C. or higher in applications such as an electric furnace, etc., a ceramic material such as alumina, zirconia, magnesia, calcia, carbon, silica, etc. or a composite material thereof, or a metal being a high melting metal such as molybdenum, tungsten, tantalum, platinum, iridium, etc. or an alloy thereof, can be used.

Further, if satisfactory strength is to be achieved, the entire cylindrical member 2 may be formed thin. That is to say, the cylindrical section may also be formed thin.

The optical means 3 is an optical member and also a light guide pipe. This light guide pipe is, e.g., formed of copper into a cylindrical pipe shape and has open sections 31 and 32 at both ends. In addition, an inner face of the light guide pipe is mirror-polished and has gold plating applied thereto. Accordingly, the inner face of the light guide pipe has high reflectivity and functions as an optical function section 33 to guide infrared light along the inner face.

Such light guide pipe has an outer diameter dimension smaller than an inner diameter dimension of the cylindrical member 2 and is disposed to be accommodated inside the cylindrical member 2.

Specifically, it is configured that a predetermined gap Gp is formed so that an outer circumferential surface of the light guide pipe and an inner circumferential surface of the cylindrical member 2 do not directly contact each other. For this reason, due to the gap Gp, an air layer as a heat insulating layer is interposed between the light guide pipe and the cylindrical member 2. In addition, an infrared light inlet, i.e., the open section 31, at one end of the light guide pipe faces the thin wall section being the temperature-sensitive section 23 of the cylindrical member 2, and the open section 32 at the other end is located on the side where the open section 22 of the cylindrical member 2 is and faces the later-described infrared temperature detecting member 4. That is, a region spaced between the temperature-sensitive section and the infrared light inlet by the predetermined dimension is formed between the closed section 21 of the cylindrical member 2 and the open section 31 at one end of the light guide pipe.

Accordingly, the optical function section 33 functions to restrict infrared light radiated from the region spaced between the temperature-sensitive section and the infrared light inlet by the predetermined dimension to a range of the region by the infrared light inlet and guide the infrared light to the infrared temperature detecting member.

The infrared temperature detecting member 4 includes a thermopile element 41 as a sensing element that senses infrared light, a thermistor element 42 as a sensing element for temperature compensation, and a package 43 as an envelope that accommodates these sensing elements. Such infrared temperature detecting member 4 is disposed on the side where the open section 22 of the cylindrical member 2 is, facing and spaced from the temperature-sensitive section 23.

The thermopile element 41 is composed of a plurality of thermocouples formed on a substrate, and outputs, as an output voltage, an electromotive force generated by receiving infrared light. In addition, the thermistor element 42 is mounted on a substrate, having a resistance value that varies with variation in temperature and detecting an ambient temperature according to the variation in the resistance value.

The package 43 includes a cap 44 made of metal into a substantially cylindrical shape and a stem 45 similarly made of metal into a substantially disk shape. A circularly opened window 48 is formed on an upper surface side of the cap 44.

The thermopile element 41 and the thermistor element 42 are disposed on an upper surface of the stem 45. Four lead terminals 46 are attached to the stem 45 by vertically passing therethrough. The lead terminals 46 and electrodes of the thermopile element 41 and the thermistor element 42 are connected by bonding wires. In this way, a driving power can be supplied to or a detection signal can be sent to the thermopile element 41 and the thermistor element 42.

Moreover, a chip-type thermistor, a thermocouple and a resistance thermometer may be used as the sensing element for temperature compensation. The above are preferably accommodated in the package 43, but may also be arranged outside the package 43 as long as the ambient temperature can be detected.

In addition, the form or configuration of the infrared temperature detecting member 4 is not particularly limited as long as the infrared temperature detecting member 4 has a function of detecting a temperature by infrared light.

The holder 5 is formed from a metal material having good thermal conductivity, e.g., a material such as aluminum alloy, stainless steel or brass, etc., into a substantially cylindrical shape, and has an external threaded section 51 on its outer circumferential surface and a flange section 52 at its end part. In addition, a member attachment section is formed on an inner circumferential side of the holder 5. The aforementioned cylindrical member 2, optical means 3 and infrared temperature detecting member 4 are attached to be fitted into and fixed to this member attachment section.

In addition, an insulating member 53 holding the infrared temperature detecting member 4 in an insulated manner is attached from the side of the flange 52 of the holder 5. Further, lead wires that are not illustrated are connected to the lead terminals 46 that pass through and protrude from the insulating member 53 so as to be led out. These led-out lead wires are protected by being covered by a metal pipe or a protection tube.

The contact-type infrared temperature sensor 1 configured in this way is mounted by screwing the external threaded section 51 of the holder 5 into a screw hole of an exhaust pipe Ep or the like as an exhaust passage through which an exhaust gas G emitted from an engine passes. In this case, the temperature-sensitive section 23 of the cylindrical member 2 is exposed to the high-temperature exhaust gas G so as to receive heat of the exhaust gas G.

Next, actions and effects of the contact-type infrared temperature sensor 1 are described. The cylindrical member 2 arranged in the high-temperature atmosphere of the exhaust gas G (heat source) receives the heat of the exhaust gas G mainly at the temperature-sensitive section 23 thereof.

Based on the heat reception of the temperature-sensitive section 23, the infrared light radiated from the region spaced between the temperature-sensitive section and the infrared light inlet by the predetermined dimension that includes the temperature-sensitive section 23 is restricted to the range of the region by the open section 31 as the infrared light inlet at one end of the light guide pipe as the optical means 3, and is guided to the side where the open section 32 at the other end of the light guide pipe is along the inner face of the light guide, i.e., by means of the optical function section 33, and passes through the window 48 at the package 43 of the infrared temperature detecting member 4 so as to be received by the thermopile element 41.

The thermopile element 41 that has received infrared energy outputs, as the output voltage, the electromotive force caused by a temperature difference. On the other hand, the ambient temperature is detected as a variation in the resistance value by the thermistor element 42 that detects the ambient temperature, and according to this detection result and the aforementioned output, an amount of the infrared light radiated from the temperature-sensitive section 23 is accurately measured and the temperature of the exhaust gas G is measured.

In such contact-type infrared temperature sensor 1, the temperature-sensitive section 23 is disposed spaced from the infrared temperature detecting member 4, and it is the cylindrical member 2 that is directly placed in the high-temperature exhaust gas G. As a result, the infrared temperature detecting member 4 can avoid being exposed in the high-temperature exhaust gas G, and thermal deterioration of the infrared temperature detecting member 4 can be suppressed. In addition, since the temperature-sensitive section 23 is a thin wall section, high-speed thermal responsiveness can be realized.

Moreover, since the light guide pipe and the cylindrical member 2 have a heat insulating layer formed therebetween due to the gap Gp, the heat of the cylindrical member 2 can be suppressed from being transmitted to the light guide pipe and being conducted to the infrared temperature detecting member 4. Further, because the holder 5 is formed of a material having good thermal conductivity, the heat transmitted from the cylindrical member 2 can be effectively dissipated and a thermal effect on the infrared temperature detecting member 4 can be reduced.

According to the contact-type infrared temperature sensor 1 of this embodiment, even if the temperature-sensitive section 23 of the cylindrical member 2 has a temperature of 1000° C., the temperature of the infrared temperature detecting member 4 can be maintained at 150° C. or lower.

Moreover, although the cylindrical member 2 in the above has been described as being formed of a metal material, the cylindrical member 2 may also be formed of a ceramic material. For example, alumina can be used. Alumina is a material excellent in heat resistance and is applicable even in a high-temperature atmosphere at 1600° C.

If the cylindrical member 2 is formed of ceramics, the wall thickness dimension $t_1$ of the cylindrical section is set about 1 mm, and the wall thickness dimension $t_2$ of the thin wall section is set about ½ or less of 0.5 mm or less.

Moreover, although it is preferred to use alumina as the ceramic material, silicon carbide, quartz glass, silicon nitride or the like, zirconia and other ceramic materials may also be used.

Due to such configuration, thermal responsiveness is accelerated, and it is the ceramic cylindrical member 2 that is directly placed in the high-temperature exhaust gas G. Therefore, the infrared temperature detecting member 4 is prevented from thermal deterioration and is increased in reliability, and a stable temperature measurement is possible.

As stated above, according to this embodiment, since it is the cylindrical member 2 that is directly placed in the high-temperature exhaust gas G, the infrared temperature detecting member 4 can be prevented from thermal deterioration and reliability thereof can be ensured. Accordingly, the contact-type infrared temperature sensor 1 suitable for measuring the temperature of the exhaust gas G of a car can be provided.

Figure 3:
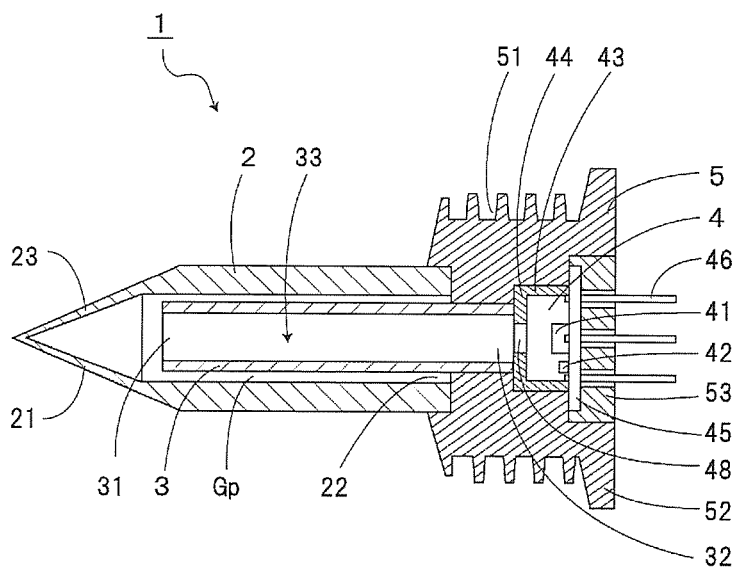
FIG. 3 is a cross-sectional view showing a contact-type infrared temperature sensor (Example 1) according to the second embodiment of the invention.
Figure 4:
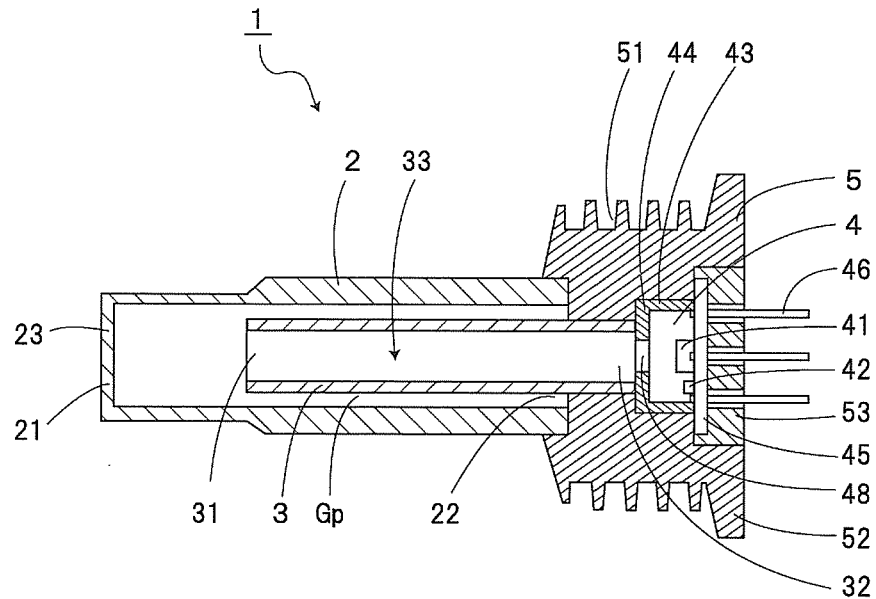
FIG. 4 is a cross-sectional view showing the same contact-type infrared temperature sensor (Example 2).

Next, a contact-type infrared temperature sensor according to the second embodiment of the invention is described with reference to FIG. 3 and FIG. 4. FIG. 3 shows a cross-section of the contact-type infrared temperature sensor (Example 1), and FIG. 4 shows a cross-section of the contact-type infrared temperature sensor (Example 2).

Moreover, in the following embodiments, the same or equivalent parts to those in the first embodiment are denoted with the same reference numerals, and repeated descriptions will be omitted.

This embodiment differs from the first embodiment in the shape of the thin wall section being the temperature-sensitive section 23 of the cylindrical member 2.

Example 1

As shown in FIG. 3, the temperature-sensitive section 23 is formed into a conical shape. Accordingly, the conical part is formed into a thin wall section, and an inner face thereof faces the open section 31 of a light guide pipe as the optical means 3. In addition, the open section inside the thin wall section functions as a black body so as to obtain high emissivity.

Further, Further, it is possible to receive heat of the fluid in the exhaust gas G and the like in the wide outer circumferential surface of a conical shape, which is one of the preferred shapes of the temperature sensing portion 23.

According to such configuration, the same effects as those in the first embodiment can be achieved.

Example 2

As shown in FIG. 4, the temperature-sensitive section 23 is formed into a cylindrical shape. Accordingly, the cylindrical part is formed into a thin wall section, and an inner face thereof faces the open section 31 of a light guide pipe as the optical means 3.

Accordingly, the same effects as those in Example 1 can be achieved.

Figure 5:
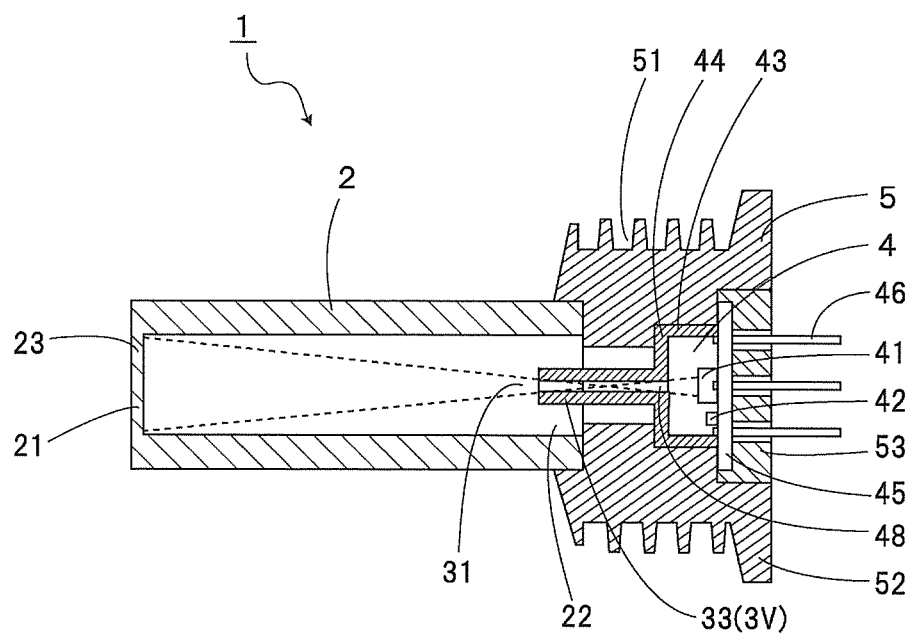
FIG. 5 is a cross-sectional view showing a contact-type infrared temperature sensor according to the third embodiment of the invention.

Next, a contact-type infrared temperature sensor according to the third embodiment of the invention is described with reference to FIG. 5. FIG. 5 shows a cross-section of the contact-type infrared temperature sensor. A viewing angle restricting member 3V acting as the optical function section 33 is located on the side where the open section 22 of the cylindrical member 2 is, and is provided facing the infrared temperature detecting member 4. The viewing angle restricting member 3V is integrally formed with the cap 44 of the infrared temperature detecting member 4, properly restricting a light receiving field of view of the thermopile element 41 to efficiently concentrate light.

Accordingly, the infrared light radiated from the region spaced between the temperature-sensitive section and the infrared light inlet that includes the temperature-sensitive section 23 is restricted by the viewing angle restricting member 3V and guided to the infrared temperature detecting member 4, so as to be efficiently concentrated at the thermopile element 41.

According to the embodiments of the invention as described above, since the infrared temperature detecting member 4 does not include a later-described infrared filter, the output voltage from the infrared temperature detecting member 4 can be increased. Meanwhile, as stated above, even if the temperature-sensitive section 23 of the cylindrical member 2 has a temperature of 1000° C., the temperature of the infrared temperature detecting member 4 can be maintained at 150° C. or lower. Therefore, the infrared temperature detecting member 4 can avoid damage caused by heat.

Figure 6:
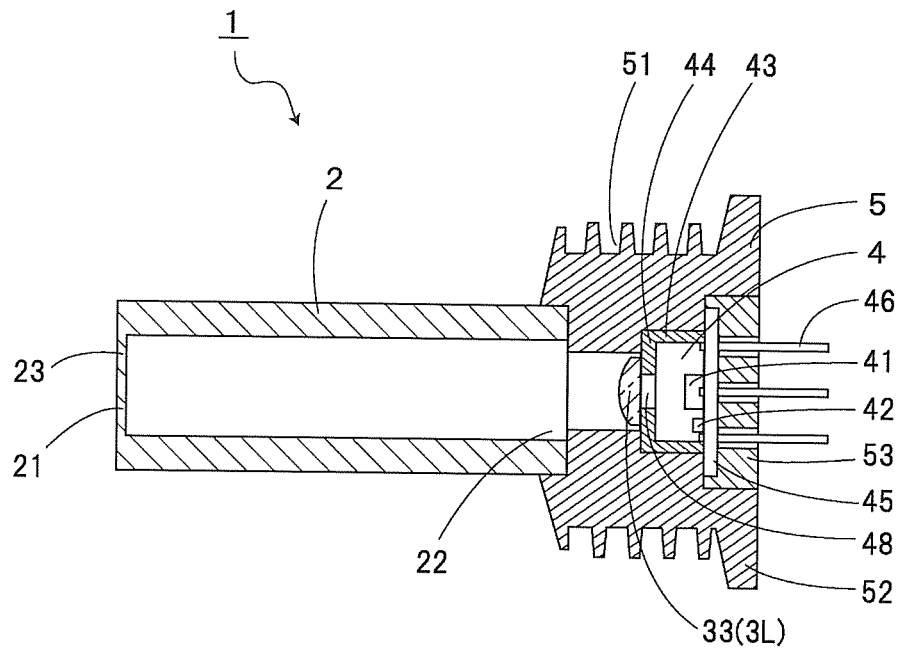
FIG. 6 is a cross-sectional view showing a contact-type infrared temperature sensor (Example 1) according to a reference embodiment of the invention.
Figure 7:
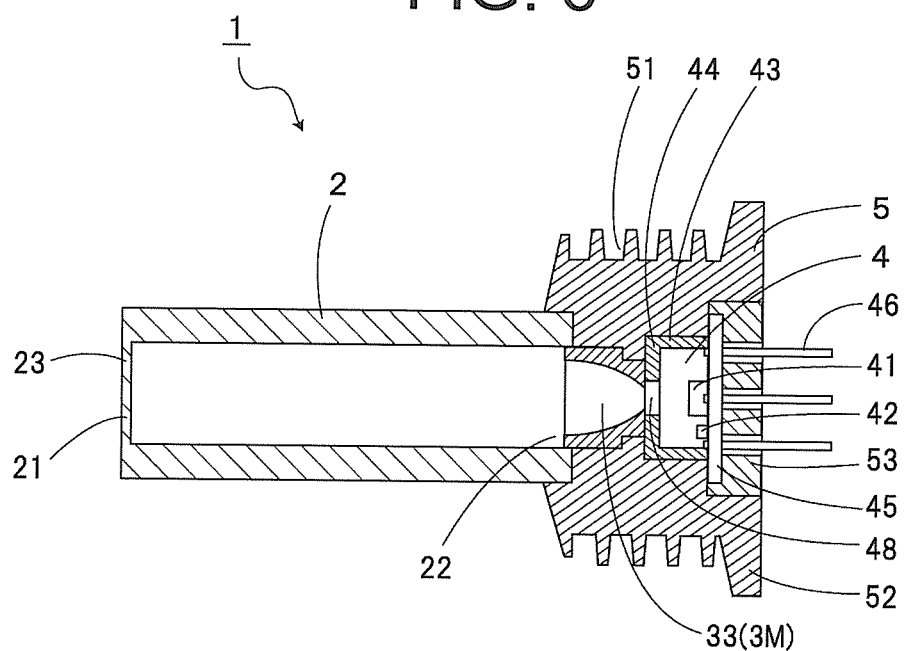
FIG. 7 is a cross-sectional view showing a contact-type infrared temperature sensor (Example 2) according to the same reference embodiment.

Next, a contact-type infrared temperature sensor according to a reference embodiment of the invention is described with reference to FIG. 6 and FIG. 7. FIG. 6 shows a cross-section of the contact-type infrared temperature sensor (Example 1), and FIG. 7 shows a cross-section of the contact-type infrared temperature sensor (Example 2).

10062.21 In this embodiment, the optical means 3 such as a lens member or the like acts as the optical function section 33, functioning to concentrate the infrared light radiated from the temperature-sensitive section 23 and guide the infrared light to the infrared temperature detecting member 4.

Example 1

As shown in FIG. 6, a lens member 3L acting as the optical function section 33 is located on the side where the open section 22 of the cylindrical member 2 is, and is disposed facing the window 48 formed at the cap 44 of the infrared temperature detecting member 4.

According to such configuration, the infrared light radiated from the temperature-sensitive section 23 is concentrated by the lens member 3L and guided to the infrared temperature detecting member 4. Specifically, the infrared light passes from the lens member 3L through the window 48 to be concentrated and received at the thermopile element 41.

Example 2

As shown in FIG. 7, a mirror member 3M acting as the optical function section 33 is located on the side where the open section 22 of the cylindrical member 2 is, and is disposed facing the window 48 formed at the cap 44 of the infrared temperature detecting member 4.

The mirror member 3M is made of metal or resin material and has an inner face formed by a reflecting surface in the form of a paraboloid of revolution. In addition, the thermopile element 41 of the infrared temperature detecting member 4 is arranged at a focus of this reflecting surface.

Accordingly, the infrared light radiated from the temperature-sensitive section 23 is concentrated by the mirror member 3M and guided to the infrared temperature detecting member 4. Specifically, infrared parallel light radiated from the temperature-sensitive section 23 is reflected by the reflecting surface, and passes through the window 48 so as to be efficiently concentrated at the thermopile element 41.

Figure 8:
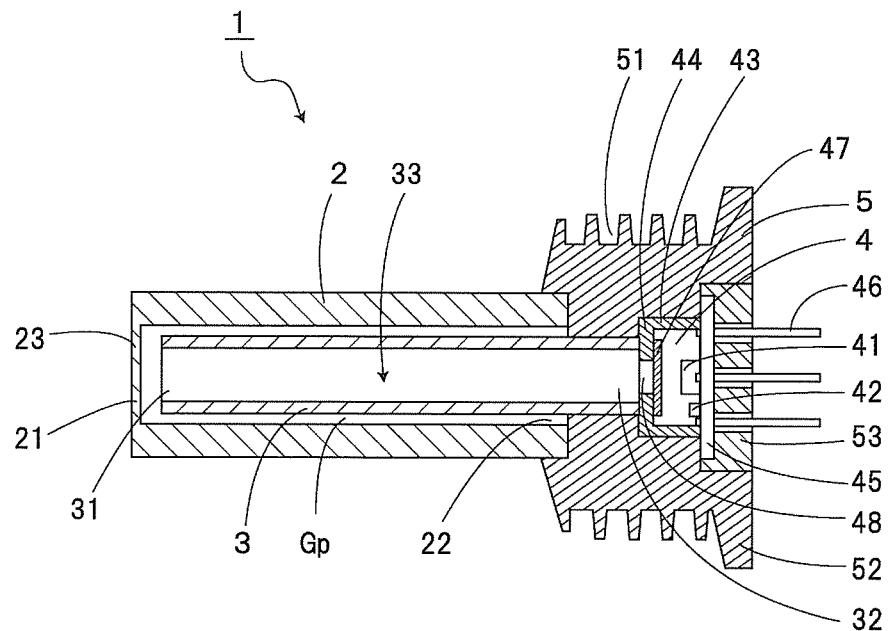
FIG. 8 is a cross-sectional view showing a contact-type infrared temperature sensor according to the same reference embodiment.
Figure 9:
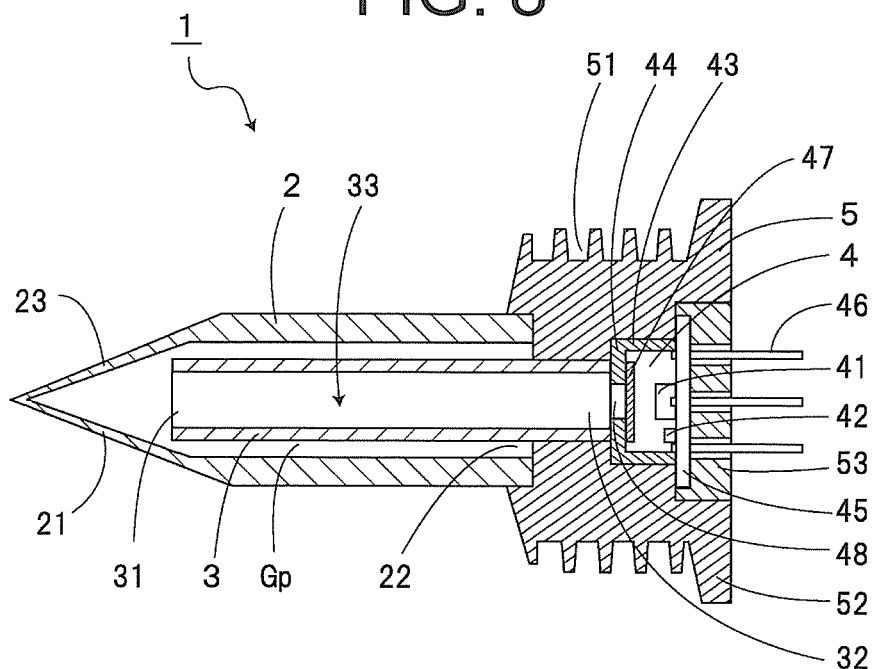
FIG. 9 is a cross-sectional view showing a contact-type infrared temperature sensor according to the same reference embodiment.

Next, a contact-type infrared temperature sensor according to a reference embodiment of the invention is described with reference to FIG. 8 and FIG. 9. FIG. 8 and FIG. 9 show cross-sections of the contact-type infrared temperature sensor.

In this embodiment, an infrared filter 47 is provided at the window 48 formed at the cap 44 of the infrared temperature detecting member 4. The infrared filter 47 has a function of selectively transmitting infrared light, and in this embodiment, the infrared filter 47 for transmitting infrared light having a wavelength of 5 μm to 20 μm is used. A transmission wavelength of infrared light is not limited but may be suitably set depending on the measured temperature.

The contact-type infrared temperature sensor 1 shown in FIG. 8 uses the contact-type infrared temperature sensor 1 of the first embodiment (FIG. 2) as its basic configuration. The contact-type infrared temperature sensor 1 shown in FIG. 9 uses the contact-type infrared temperature sensor 1 of the second embodiment (Example 1) (FIG. 3) as its basic configuration. Moreover, in these contact-type infrared temperature sensors 1, the infrared filter 47 is provided at the window 48 of the infrared temperature detecting member 4.

Due to such configuration, based on the heat reception of the temperature-sensitive section 23, the infrared light radiated from the region spaced between the temperature-sensitive section and the infrared light inlet that includes the temperature-sensitive section 23 is guided to the side where the open section 32 at the other end of the light guide pipe is by means of the optical function section 33, and is transmitted through the infrared filter 47 at the window 48 of the infrared temperature detecting member 4 so as to be received by the thermopile element 41.

Accordingly, since an intended infrared light can be selectively received by the thermopile element 41, accuracy of temperature measurement can be improved.

Figure 10:
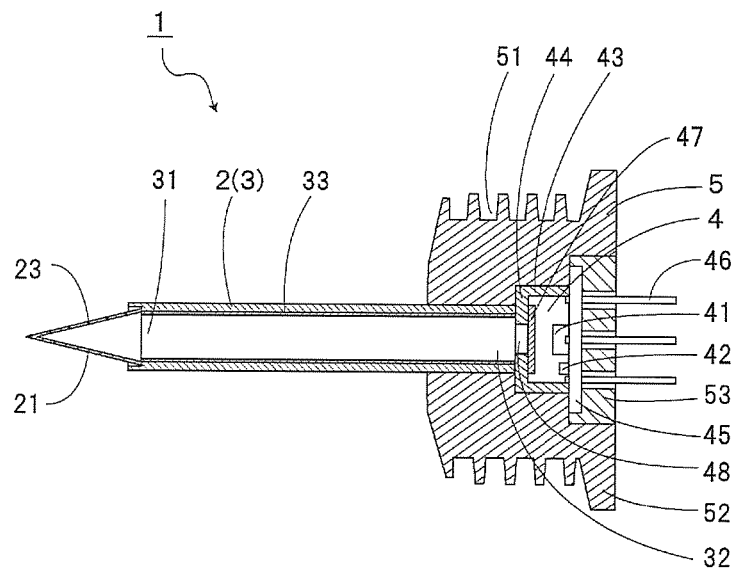
FIG. 10 is a cross-sectional view showing a contact-type infrared temperature sensor according to the same reference embodiment.

Next, a contact-type infrared temperature sensor according to reference embodiment of the invention is described with reference to FIG. 10. FIG. 10 shows a cross-section of the contact-type infrared temperature sensor.

This embodiment shows a configuration in which the cylindrical member 2 also serves as the light guide pipe as the optical means 3.

The light guide pipe as the optical means 3 is, e.g., formed of copper into a cylindrical pipe shape and has the open sections 31 and 32 at both ends. In addition, the inner face of the light guide pipe is mirror-polished and has gold plating applied thereto, and thus has high reflectivity and functions as the optical function section 33 to guide infrared light along the inner face.

In addition, the temperature-sensitive section 23 formed into a conical shape is joined to the open section 31 at one end by brazing, etc. The temperature-sensitive section 23 is, e.g., made out of stainless steel, and formed thin. On the other hand, the open section 32 at the other end faces the infrared temperature detecting member 4.

Accordingly, the optical function section 33 functions to receive heat by the temperature-sensitive section 23 being a thin wall section and to guide the infrared light radiated from the temperature-sensitive section 23 to the infrared temperature detecting member 4.

According to such configuration, the same effects as those in the first embodiment can also be achieved.

Next, characteristics of a contact-type infrared temperature sensor are described with reference to FIG. 11 and FIG. 12. Specifically, the characteristics of the contact-type infrared temperature sensor 1 according to the embodiment shown in FIG. 8 and FIG. 9 are shown, wherein FIG. 11 illustrates a temperature sensing characteristic, and FIG. 12 illustrates a response characteristic.

Figure 11:
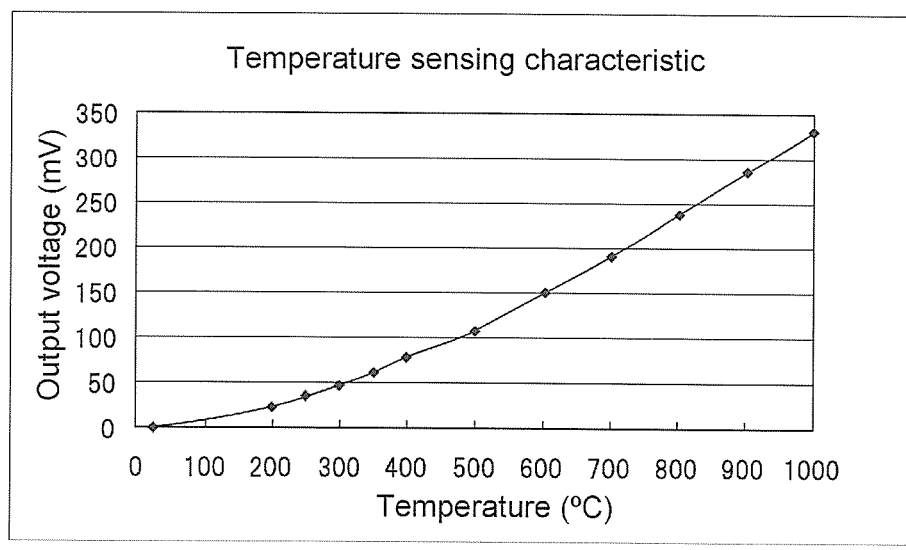
FIG. 11 is a graph showing a temperature sensing characteristic of a contact-type infrared temperature sensor.

In FIG. 11, the horizontal axis indicates a temperature (° C.) of a measured object (heat source), and the vertical axis indicates an output voltage (mV) of the contact-type infrared temperature sensor 1. As shown in the drawing, the output voltage increases with a rise in temperature. For example, when the temperature is 200° C., a voltage of about 25 mV is outputted, and when the temperature is 1000° C., a voltage of about 330 mV is outputted.

Figure 12:
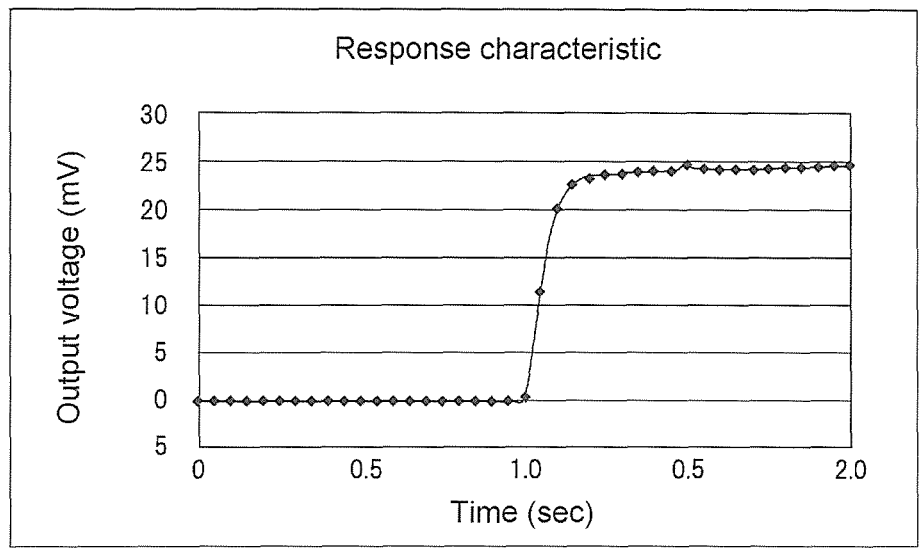
FIG. 12 is a graph showing a response characteristic of a contact-type infrared temperature sensor.

In addition, in FIG. 12, the horizontal axis indicates time (sec), and the vertical axis indicates output voltage (mV). As shown in the drawing, when the temperature is 200° C. (with an output voltage of 25 mV), a response is made within about one second, and it is known that the responsiveness is good.

Next, embodiments that use the contact-type infrared temperature sensor 1 are described. The contact-type infrared temperature sensor 1 is used in various thermal apparatuses having a heat source for measuring a temperature of the heat source.

For example, the contact-type infrared temperature sensor 1 can be applied to thermal apparatuses such as an engine using an exhaust gas as the heat source, a microwave oven, an IH cooking heater, a gas water heater, a stove, etc. In addition, the contact-type infrared temperature sensor 1 can also be used for measuring a temperature of an electrolyte of a fuel cell, a fuel reformer, etc.

Figure 13:
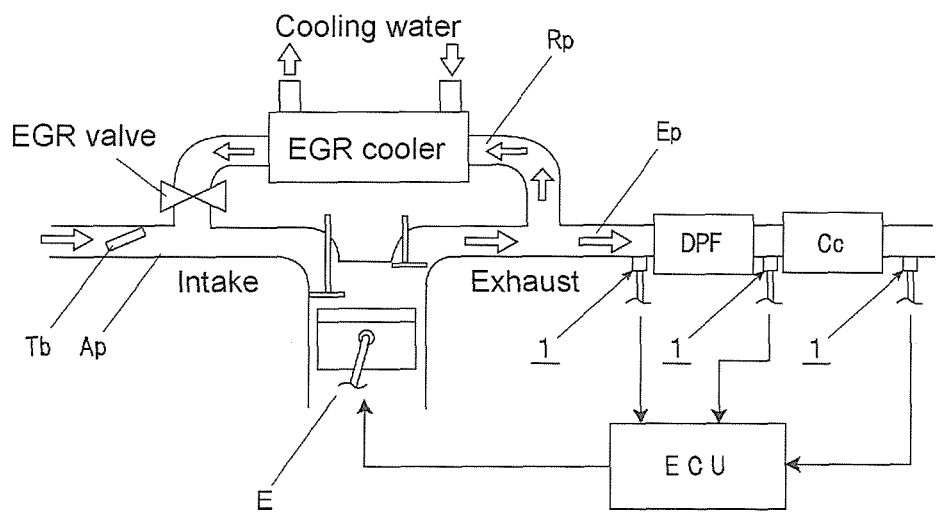
FIG. 13 is a configuration diagram showing an exhaust system according to an embodiment of the invention.

Specifically, an embodiment using the contact-type infrared temperature sensor 1 in an EGR system is described with reference to FIG. 13.

The EGR system includes an engine E, an intake passage Ap, an exhaust passage Ep, an EGR exhaust passage Rp and an engine control unit ECU. In addition, a throttle valve Tb is provided at the intake passage Ap, and a diesel particulate filter DPF and a NOx purification catalyst converter Cc are provided on a downstream side of the exhaust passage Ep. Further, an EGR cooler and an EGR valve are disposed at the EGR exhaust passage Rp.

In an EGR system of such configuration, the aforementioned contact-type infrared temperature sensor 1 is attached to a plurality of positions in the exhaust passage Ep. A detected exhaust gas temperature detected by the contact-type infrared temperature sensor 1 is inputted to the engine control unit ECU and an operation state of the engine E is controlled.

As stated above, the contact-type infrared temperature sensor 1 can be suitably used in an EGR system and other exhaust systems.

Further, an embodiment using the contact-type infrared temperature sensor 1 for measuring a temperature of an in-furnace molten metal in an electric furnace or a gas furnace is described.

In this case, the basic configuration described in the aforementioned third embodiment can be suitably used. As shown in FIG. 5, the viewing angle restricting member 3V is located on the side where the open section 22 of the cylindrical member 2 is, and is provided facing the infrared temperature detecting member 4, so that the viewing angle restricting member 3V restricts the light receiving field of view of the thermopile element 41.

The cylindrical member 2 is made of ceramics and is formed into a bottomed cylindrical shape with one end as the closed section 21 and the other end as the open section 22. The viewing angle restricting member 3V having a cylindrical pipe shape is disposed inside the cylindrical member 2. The viewing angle restricting member 3V is made out of an aluminum material and its surface is subjected to a black alumite treatment. That is to say, the viewing angle restricting member 3V is configured to reduce reflectivity.

Accordingly, because of the viewing angle restricting member 3V, infrared light radiated from inside the cylindrical member 2 is properly restricted, i.e., restricted to the infrared light radiated from the region spaced between the temperature-sensitive section and the infrared light inlet that includes the temperature-sensitive section 23 being the closed section 21 so as to be received by the infrared temperature detecting member 4.

Moreover, the viewing angle restricting member 3V may also be capable of adjusting a viewing angle by being moved forward and backward in an axial direction inside the cylindrical member 2. Specifically, for example, an adjustment method is conceivable in which the viewing angle restricting member 3V is configured to be screwed into the holder 5 and the viewing angle restricting member 3V is rotated to be moved forward and backward in the axial direction.

In addition, although it is preferred that the temperature-sensitive section 23 be formed thin, the temperature-sensitive section 23 may have the same wall thickness dimension as the cylindrical section. Further, length dimensions or diameter dimensions of the cylindrical member 2 and the viewing angle restricting member 3V in the axial direction are not particularly limited but can be suitably selected according to specifications. Furthermore, the viewing angle restricting member 3V is not necessarily subjected to a black alumite treatment, but may be subjected to a treatment as long as the treatment will reduce reflectivity.

Moreover, the invention is not limited to the configurations in the above embodiments but can be transformed in various ways without departing from the gist of the invention. In addition, the above embodiments are presented as examples but are not intended to limit the scope of the invention.

For example, a flat shape, a cylindrical shape or a conical shape, or a combined shape of these shapes, etc., may be suitably adopted as the shape of the temperature-sensitive section. The shape is not particularly limited.

The infrared temperature detecting member can employ a temperature sensing element of a thermal type or quantum type. In the case of a thermal type, a thermopile, a thermistor and a pyroelectric element can be used; in the case of a quantum type, indium antimonide (InSb), mercury cadmium telluride (HgCdTe) or lead tin telluride (PbSnTe) can be used. The form or configuration of the infrared temperature detecting member is not particularly limited.

DESCRIPTION OF REFERENCE NUMERALS

1: Contact-type infrared temperature sensor
2: Cylindrical member
3: Optical means
4: Infrared temperature detecting member
5: Holder
21: Closed section
22: Open section
23: Temperature-sensitive section
33: Optical function section
41: Thermopile element
42: Thermistor element
43: Package
44: Cap
45: Stem
47: Infrared filter
48: Window
51: External threaded section
53: Insulating member

What is claimed is:

1. A contact-type infrared temperature sensor, comprising:
a heat-resistant cylindrical member, having a cylindrical shape with one end as a closed section and the other end as an open section and comprising a temperature-sensitive section on a side of the closed section;
an infrared temperature detecting member, disposed facing and spaced from the temperature-sensitive section, comprising no infrared filter and configured such that infrared light radiated from the temperature-sensitive section enters directly; and
an optical function section, having an infrared light inlet disposed facing and spaced from the temperature-sensitive section by a predetermined dimension, wherein the optical function section restricts the infrared light radiated from a region spaced between the temperature-sensitive section and the infrared light inlet by the predetermined dimension to a range of the region by the infrared light inlet and guides the infrared light to the infrared temperature detecting member.

2. The contact-type infrared temperature sensor for high temperature measurement according to claim 1, wherein a wall thickness dimension of the temperature-sensitive section is formed to ½ or less of a wall thickness dimension of a cylindrical section of the cylindrical member.

3. The contact-type infrared temperature sensor for high temperature measurement according to claim 1, wherein a cylindrical section and the temperature-sensitive section of the cylindrical member are formed separately, and a material of the cylindrical member is metal or ceramics.

4. The contact-type infrared temperature sensor for high temperature measurement according to claim 1, wherein the infrared temperature detecting member is integrally formed with the optical function section.

5. A thermal apparatus, comprising:
   a heat source; and
   the contact-type infrared temperature sensor for high temperature measurement according to claim 1 suitable for temperature of 200° C. or higher that measures a temperature of the heat source.

6. An exhaust system, comprising:
   an engine;
   an intake passage and an exhaust passage connected to the engine; and
   the contact-type infrared temperature sensor for high temperature measurement according to claim 1 suitable for temperature of 200° C. or higher attached to the exhaust passage.

7. The contact-type infrared temperature sensor for high temperature measurement according to claim 1, wherein the optical function section is configured to be able to move forward and backward in an axial direction inside the cylinder member, such that the infrared light radiated from the region spaced by the predetermined dimension is adjustable.

\* \* \* \* \*